(12) United States Patent
Das et al.

(10) Patent No.: US 7,328,074 B2
(45) Date of Patent: Feb. 5, 2008

(54) REAL-TIME QUADRATIC PROGRAMMING FOR CONTROL OF DYNAMICAL SYSTEMS

(75) Inventors: Indraneel Das, Vernon, CT (US);
James W. Fuller, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 723 days.

(21) Appl. No.: 10/308,285

(22) Filed: Dec. 2, 2002

(65) Prior Publication Data

US 2004/0107012 A1 Jun. 3, 2004

(51) Int. Cl.
*G05F 13/02* (2006.01)
*G06F 7/60* (2006.01)
*H02P 1/54* (2006.01)
*A24F 27/12* (2006.01)
*C06C 5/00* (2006.01)

(52) U.S. Cl. .................. 700/28; 700/29; 700/53; 703/2; 318/56

(58) Field of Classification Search .......... 700/53, 700/29, 28; 237/8 R; 342/357.11; 703/2; 318/56
See application file for complete search history.

(56) References Cited

U.S. PATENT DOCUMENTS

| | | | |
|---|---|---|---|
| 5,548,293 A * | 8/1996 | Cohen | 342/357.11 |
| 5,642,722 A | 7/1997 | Schumacher et al. | |
| 5,682,309 A * | 10/1997 | Bartusiak et al. | 700/29 |
| 5,819,714 A | 10/1998 | Bush et al. | |
| 6,289,508 B1 | 9/2001 | Erickson et al. | |
| 6,330,483 B1 | 12/2001 | Dailey | |
| 6,439,469 B1 * | 8/2002 | Gruber et al. | 237/8 R |
| 7,082,305 B2 * | 7/2006 | Willars et al. | 455/441 |
| 7,152,023 B2 * | 12/2006 | Das | 703/2 |
| 2004/0162709 A1 * | 8/2004 | Das | 703/2 |
| 2006/0282178 A1 * | 12/2006 | Das et al. | 700/28 |

FOREIGN PATENT DOCUMENTS

| | | |
|---|---|---|
| EP | 0439935 A2 | 8/1991 |
| WO | WO 01/82007 A2 | 11/2001 |
| WO | WO 02/097540 A1 | 12/2002 |

OTHER PUBLICATIONS

Zigang Pan et al. "Backstepping Design with Local Optimality Matching", Jul. 2001, IEEE, vol. 46, No. 7, 1014-1027.*
Wikipedia definition for "Active Set" (http://www.wikipedia.org/wiki/Active_set).*
Searh Report EP03256502.

* cited by examiner

*Primary Examiner*—Paul Rodriguez
*Assistant Examiner*—Sunray Chang
(74) *Attorney, Agent, or Firm*—Carlson, Gaskey & Olds

(57) ABSTRACT

Real-time control of a dynamical system is provided by determining control variables that get as close as possible to producing a desired response. Additional consideration of physical limitations leads to a convex Quadratic Program with inequality constraints that needs to be solved in real-time. A new active set algorithm is described to solve the convex Quadratic Program efficiently that meets real-time requirements. Based on the key observation that the physical limitations of the system translate to optimal active sets that remain relatively unchanged over time (even though the actual optimal controls may be varying), starting guesses for the active set obtained from the final iterate in the previous time period greatly reduces the number of iterations and hence allows the Quadratic Programs to be solved to convergence in real-time.

20 Claims, 4 Drawing Sheets

REAL-TIME QUADRATIC PROGRAMMING FOR CONTROL OF DYNAMICAL SYSTEMS

This invention was conceived in performance of work under U.S. Government Contract N00421-01-2-0131.

BACKGROUND OF THE INVENTION

The present invention relates generally to control systems and more particularly to dynamic inversion control systems using quadratic programming.

Time varying systems can be modeled by a set of linearized algebraic equations that relate the outputs and performance indices of the system to the inputs at every instant in time (in a nonlinear dynamical system, these equations change at every time instant). These inputs are formally known as control variables, because the values of these variables are under the control of the operator. The aim is to find the best sequence of control variables in time that maximize the performance indices of the system. In addition, the physical constraints of the system must be honored in order to prevent critical system failure. The problem of determining the best sequence of control variables requires solving a sequence of optimization problems in time, i.e., a new optimization problem at every instant in time. Each such optimization problem must be solved almost instantaneously. For the Dynamic Inversion application in systems with fast dynamics, this allows only a few milliseconds. Hence the requirement that the optimization technique come up with a solution swiftly is key in these applications.

Such a sequence of problems has directly or indirectly been posed for controlling dynamical systems in the past. However, the techniques for solving them have either not operated in real-time, because the applications were not real-time critical or operated in real-time, but the real-time interval was far more generous (perhaps of the order of hours, not milliseconds), as in control of downstream petroleum refining operations and in portfolio optimization. Other techniques operated in real-time, but the technique was such that no rigorous claim could be made about the optimality of the solution, and no attention was paid to not violating the physical constraints of the system. Examples of this technique include certain flight control algorithms.

SUMMARY OF THE INVENTION

This invention provides an optimization algorithm, which is implemented on an onboard computer for the control of a dynamical system, while honoring the physical constraints of the system to avoid critical failure or breakdown. It is particularly meant for control of systems with relatively quick dynamics, which need quick solution for control variables. The algorithm has special features that make it particularly useful for realtime control applications, as follows.

The inventive algorithm provides onboard optimization where the solution is restricted to a convex form, in general, and sometimes to quadratic programming, in order to ensure that a unique optimal solution exists, there are no local minima or maxima, and that the solution can be found with reasonable computation.

The algorithm also uses the active set method for solving realtime convex optimization problems, where the active set of a prior solution is "fedback" to initialize the search for the best active set in the current problem. This envisions application in a control system where the control solution is periodically updated at a high enough frequency that there is only little change from one update to the next.

The invention also provides an active set method of solution where the iterative search for the best active set is formulated so that every iteration is an improvement over the previous one. This implies that the algorithm can be interrupted, if necessary, or that a given iteration might fail due to unforeseen numerical problems and a good solution can still be provided from a prior iteration.

The algorithm also uses the active set method, with active set feedback, where the number of iterations in the search for best active set is fixed in order to provide predictable computation time, as required by realtime control software. The linear set of equations are solved using a combination of Cholesky and QR factorizations, in order to provide good numerical properties despite possible degeneracy in the constraints.

The central challenge is to solve the Quadratic Programming problem within the given real-time interval in which the system is considered quasi-static. In some fast system applications this time interval is only $\frac{1}{40}$th of a second, with only a few milliseconds allocated for solving the QP in the Dynamic Inversion. All existing (non-real-time) algorithms for solving QPs are iterative, in that every successive iteration leads to a (not always) better guess for the actual solution. The framework of Accelerated QP is offered by a Quadratic Programming technique based on guessing the set of binding constraints at optimality (the active set), as opposed to an interior point method, for reasons that will become clear. In this Accelerated QP algorithm, every iteration does improve the objective function monotonically. Each of these iterations involves linear algebra computation and takes a certain number of flops (floating point operations), which in turn consumes CPU time. In order to always solve a QP within a fixed (real) time interval, it would thus be necessary to solve the QP within a fixed number of iterations. While there is a theoretical maximum number of iterations within which a solution will be found using an active set method, it is not possible to always execute those iterations within the given time interval using the existing controller hardware.

Thus Accelerated QP focuses on solving each QP in as few iterations as possible, fixing the number of iterations or computation time, and making each QP iteration computationally so efficient that each iteration takes up minimal CPU time.

Key ideas behind achieving minimal iterations:

At each iteration, the active set QP algorithm guesses which constraints are binding at the solution. This guess is based on the signs of the Lagrange multipliers of the constraints estimated to be binding at that iteration (called the working set of constraints). A negative sign Lagrange multiplier indicates that it is possible to move in the interior of the corresponding constraint and improve the value of the cost function. While traditional QP algorithms drop only the constraint with the most negative Lagrange multiplier from the working set, Accelerated QP drops all the constraints with negative multipliers from the working set. This is because the traditional method may end up dropping the constraints one by one, leading to more iterations. Dropping all the constraints with negative multipliers allows the next QP iteration freedom to move in a larger subspace, and thus allows more rapid convergence to the solution in fewer iterations. This is of key importance, because in a real-time setting where the operations must be completed within a certain time interval, the QP is stopped after a fixed number of iterations.

The other important idea in minimizing the number of QP iterations required for convergence is that of a 'hot start.' A sequence of Quadratic Programs is solved in time, as required by the evolving dynamical system. Since the constraints in the QP are related to the physical state of the system, the constraints that are binding at the solution directly correspond to the physical factors limiting the system. Since these limiting factors change only little, or not at all, from one time interval to the next, the set of binding constraints from the QP in the current time step is an excellent, and most often exact, predictor of the set of binding constraints at optimality for the QP in the following time step (even though the parameters defining the QP are different). This key observation allows us to solve all the QPs to optimality in only a few iterations, which is 3-5 iterations in the worst case for a Matlab simulation for Dynamic Inversion.

If the short real time interval does not allow the solution of a QP to reach optimality, it still exits with the best solution obtained thus far. Now, since the QP that is not solved to optimality is almost similar to the QP in the following time step, the working set for the non-optimal solution is quite close to the optimal binding set for the next QP. Thus, even though the solution to a QP in a time step may not be optimal, eventually a time step is reached when the QP is solved to optimality, because the starting guess is so good. In this manner, the 'hot start' scheme allows the algorithm to 'recover from non-optimality' caused by real-time limitations in a matter of a few time steps. In computer simulations for Dynamic Inversion, optimality is seen to be achieved in just one extra time step.

The active set method is naturally capable of exploiting the 'hot start' information, which is why it forms the foundation of Accelerated QP, as opposed to an Interior Point Method.

Key ideas behind speeding up each QP iteration:

The ideas behind speeding up each iteration of the active set search rely on a combination of efficient linear algebra and performance programming methods, as is described in detail in an upcoming section

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
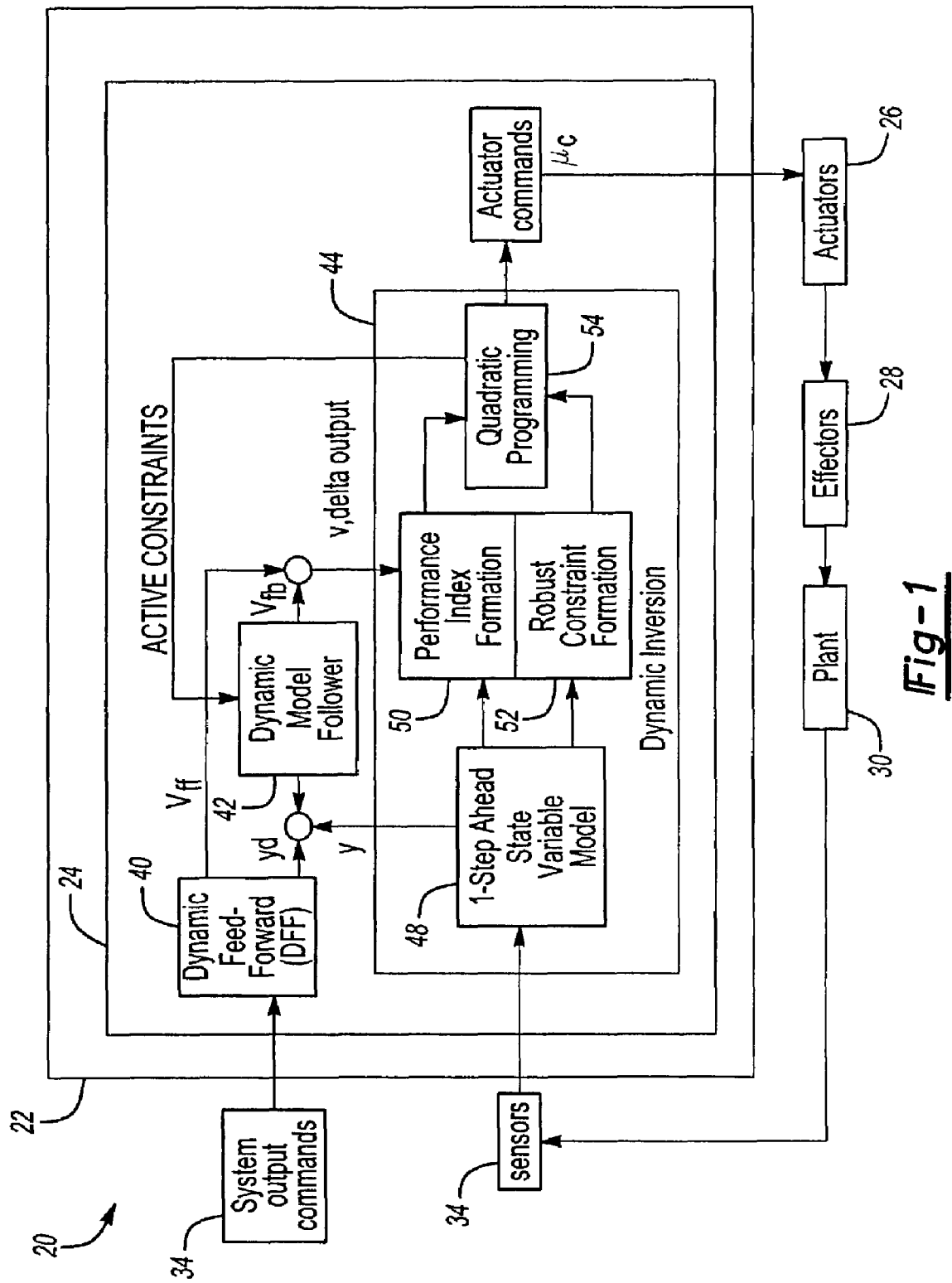
FIG. 1 illustrates the multivariable control system of the present invention.
Figure 2:
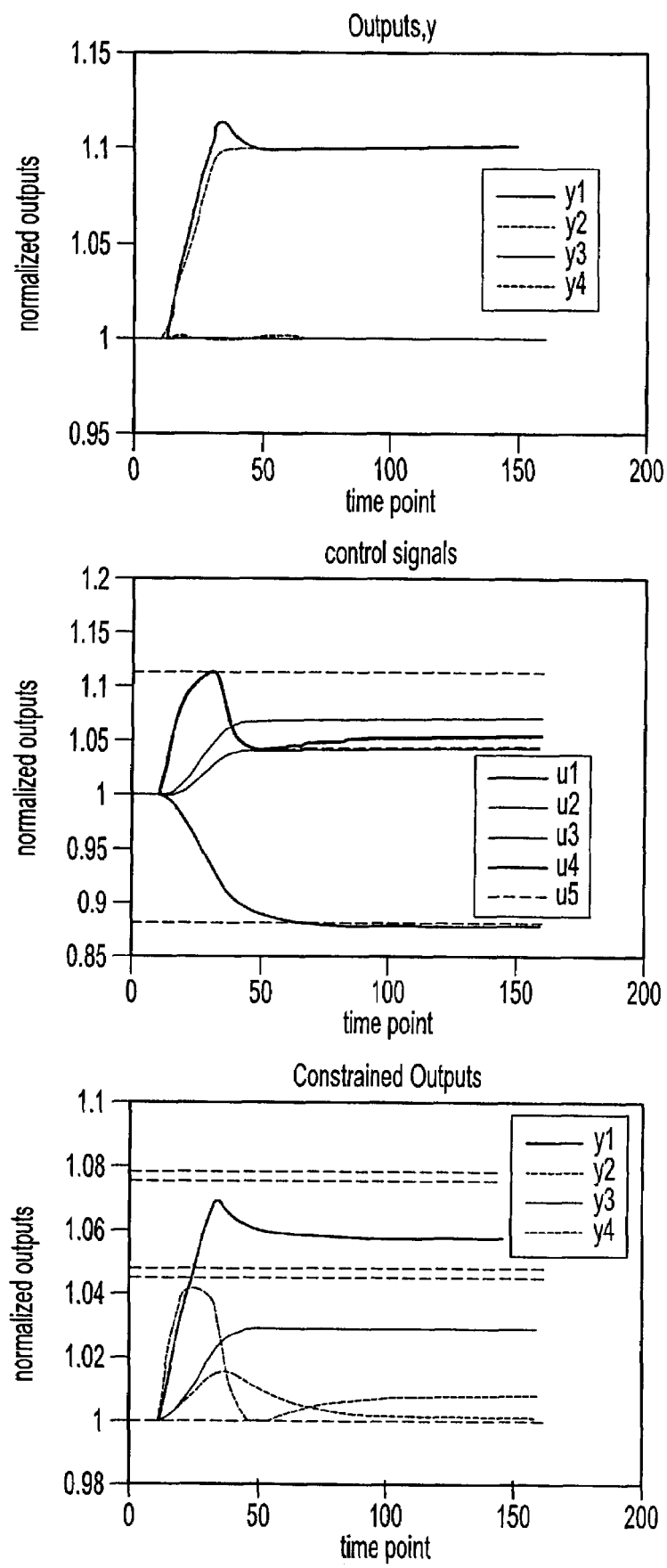
FIG. 2 shows graphs of the response of the system of FIG. 1 when no limits are reached.
Figure 3:
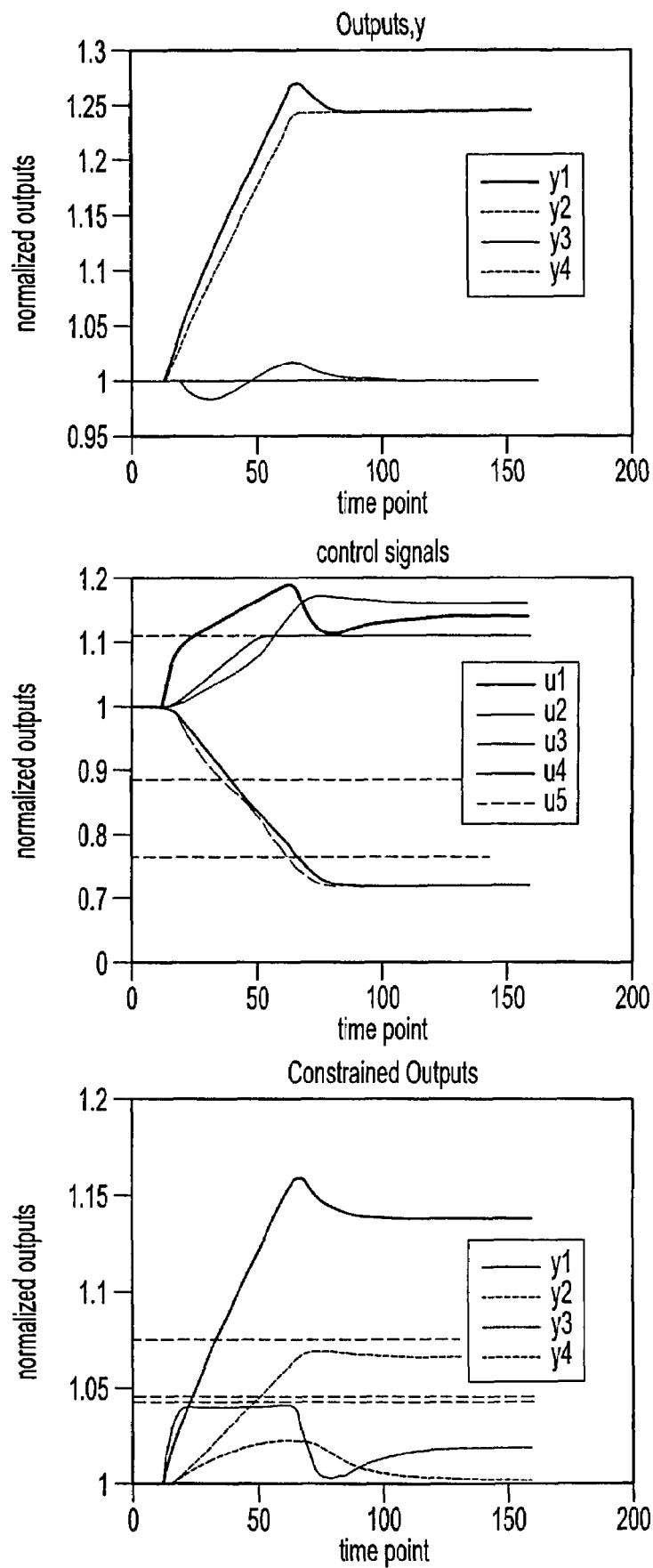
FIG. 3 shows graphs of the response of the system when limits are reached.
Figure 4:
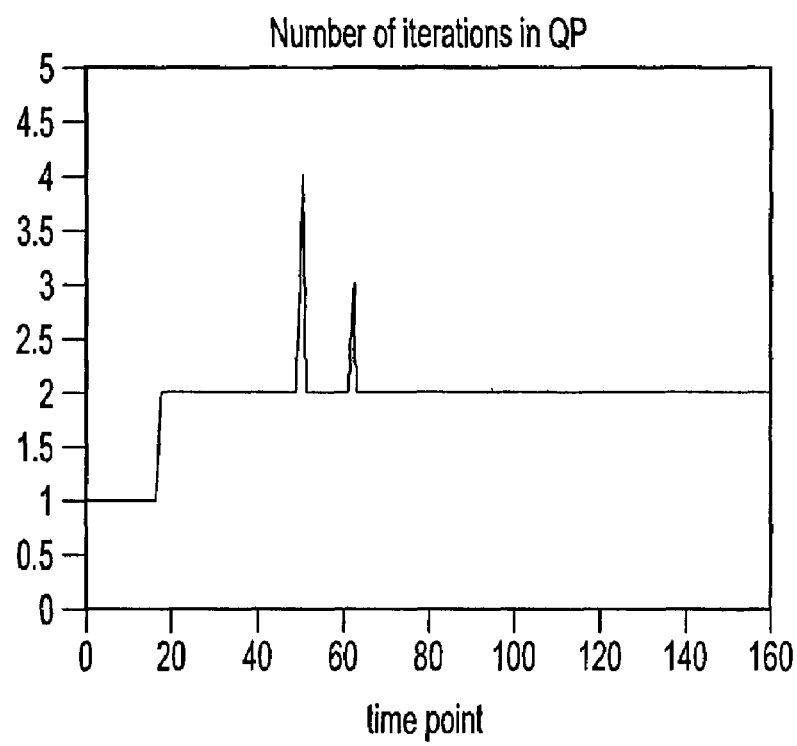
FIG. 4 shows the computational burden of the QP solver of FIG. 1.
Figure 4:
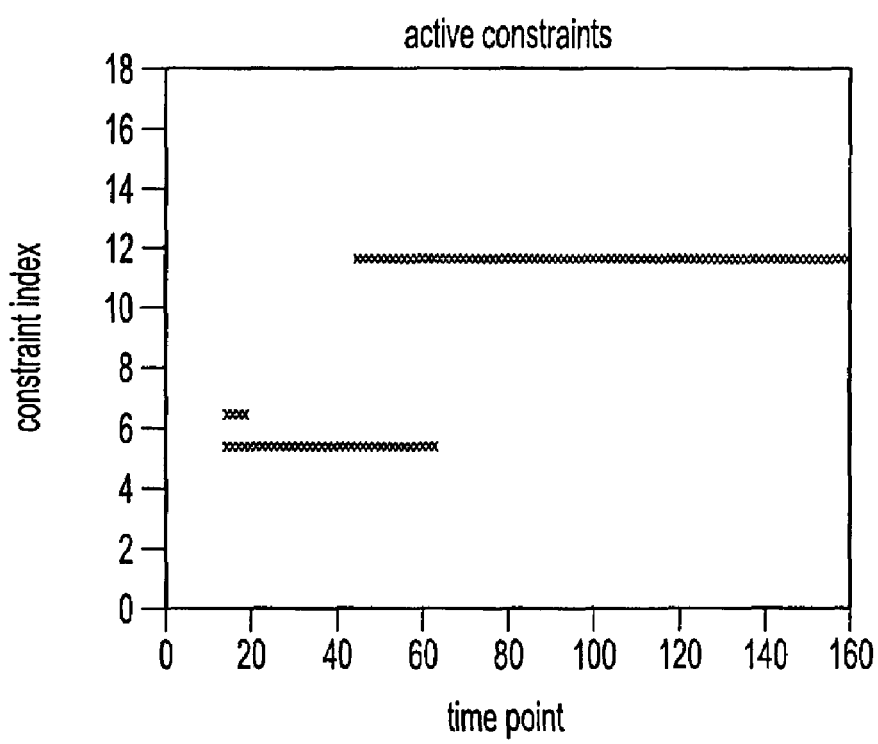

FIG. 1 illustrates a control system 20 implementing the dynamic inversion via real-time quadratic programming algorithm of the present invention. The control system 20 is briefly summarized here and described in more detail in co-pending application U.S. Ser. No. 10/308,286, entitled "Constrained Dynamic Inversion Control Algorithm," filed on the same day and by the same inventors as this patent application, and which is hereby incorporated by reference in its entirety. The constrained dynamic inversion algorithm is meant to be implemented on a discrete time sampled-data computer 22 in order to control a dynamic system. The computer 22 includes a CPU, memory 24 and other known hardware and is programmed to perform as described herein to produce actuator commands, uc. The actuator commands, uc, control a plurality of actuators 26, which take the electronic commands, uc, and turn them into physical forces that adjust a plurality of effectors 28, each of the plurality of actuators 26 being associated with one of the plurality of effectors 28. The effectors 28 change the dynamics of the plant 30. A plurality of sensors 32 provide feedback y to the computer 22. The computer 22 determines the next set of actuator commands, uc, based upon the information from the sensors 32 and based upon system output commands 34, which may come from a human operator or a higher level control system.

The computer 22 periodically samples commands, yc, and sensor feedback, y, in order to make actuator commands, uc. y(n) and yc(n) refer to values of y and yc at the nth sampling, which occurs at time n. The actuators 26 interpret uc(n) as a constant command held from time n to time n+1. y, yc, and u can all be vectors to represent multiple degrees of freedom. As used herein, the current time is time n and the time of the next controller sample is time n+1. The control algorithm is implemented via controller software. It determines the actuator commands, u, that make the system outputs, y, match the commanded values yc. The commands may come from a human operator or a higher level control system. This is a well known form of a digital computer based control system. The substance of this invention is a novel control algorithm stored in memory 24 and executed by computer 22.

The control logic (software) architecture separates control logic design and implementation into Dynamic Feed-Forward (DFF) 40, Dynamic Model Follower (DMF) 42 and Dynamic Inversion (DI) 44 modules. The DFF 40 module produces a component of a command of how the system output should change by the next controller sample period. Its design establishes the nominal command response dynamics. The DI 44 module determines effector 28 commands that best cause the system outputs to change as desired. DI 44 thus "inverts" the system dynamics by making them appear as simple, uncoupled digital integrators. Even when the system dynamics vary with configuration or operating point, the dynamics with DI 44 appear the same throughout the system's operating envelope and the same from one type of system to another. The DMF 42 module compares desired and actual system responses to adjust the output change command as needed to attenuate the effects of modeling errors and disturbances. DMF 42 establishes how quickly and completely the effects of model errors and disturbances are attenuated.

The DI 44 module can be further subdivided into four modules as shown in FIG. 1, for a total six modules as follows:

A state variable model 48 produces a linearized model for predicting values of system variables, y(n+1), one control sample ahead (a.k.a. the next step) as a function of the actuator commands, uc(n). This prediction also uses a feedback measure of the current output, y(n).

A performance index block 50 uses this model to formulate the determination of actuator commands, uc(n), as a quadratic optimization problem with linear constraints. One input to this block is the command v(n) which is the amount the system output y should change by the time n+1. The performance index contains a quadratic measure of how well this will be achieved, as predicted by the model.

A constraint block 52 transforms limits and constraints on the effectors and on various variables of system response into the form of linear inequality equations with uc(n) as the independent variables.

A quadratic programming block 54 solves the special type of optimization problem poised by the performance index and constraint equations. The quadratic programming block 54 is the focus of the present invention.

Optimization-based controllers offer several advantages. First, they offer a general, reusable method for enforcing constraints in a multivariable system. The general mathematics of constrained optimization will cause the system behavior to change as constraints are met. Secondly, they are flexible. The model, constraints, and performance index can vary between controller sample times. Control actuator failures and other system failures can be reflected in the controller as changes to the model and the imposed constraints. Once these change, the optimization-based controller will attempt to do the best job it can with the functional controls. Finally, optimization based controllers can operate at a higher level of autonomy. They can receive commands in the form of numerous and possibly conflicting goals with various and shifting priorities. The optimization enables a tradeoff among the goals. It is important to note that providing these advantages does not require the precise optimal solution per se. Instead, optimization is being used as a mathematical framework for designing control software at a higher level of abstract so it is more flexible and reusable.

Controllers operate automatically in hard real time. Because of this, associated optimization software must be highly reliable and must complete its computations within a fixed time interval. For control theoretic reasons, this interval is generally a twentieth to a tenth of the fastest time constant relevant to system operation. For example, a high performance aircraft needs to substantially attenuate the effect of a sudden gust within 0.3 seconds. This implies the controller needs to complete its computations in approximately 25 msecs. Therefore, the optimization software needs to be computationally efficient to be practically implementable.

The high level strategy for real time constrained optimization is to make the approximations necessary to pose the optimization as convex quadratic programming (QP) problems. Every convex QP problem has a unique global optimum. Algorithms for solving a QP reliable search procedures, involving predictable and reliable numerical properties. A QP problem can be formed by measuring performance with quadratic indices, expressing limits as locally linear inequality constraints, and modeling the system with locally linear, possibly parameter varying, difference equations. These are mild approximations in most applications.

The description below focuses on the formulation and solution of an instance of such a QP at every point in time, given a fixed budget for floating point operations. Clearly, it is difficult to promise that the algorithm will arrive at a solution within a fixed number of floating point operations (unless the number of floating point operations is so large that it allows a number of iterations equal to the number of combinatorial possibilities for working sets). Thus, special emphasis is given on arriving at a very good solution in the allowed time or within the floating point operation (flop) budget.

Problem Description

Consider a dynamical system with control variables u(t), u: $\mathfrak{R} \to \mathfrak{R}^n$, and state variables $\xi(t)$, $\xi: \mathfrak{R} \to \mathfrak{R}^p$. Consider a linear model for the dynamics of the system:

$$\frac{d\xi}{dt} = A_1 \xi + B_1 u$$

$$\frac{du}{dt} = B_2 u + M u_c.$$

Here $u_c$ represents the control command issued to the controllers. The responses of the system, y(t), $y: \mathfrak{R} \to \mathfrak{R}^p$ are defined as linear combinations of the state and control variables:

$$y(t) = C\xi(t) + Du(t)$$

The objective is to find $u_c(t)$ so that dy/dt matches a desired vector v as best as possible. This can be posed as $$\min \left\| \frac{dy}{dt} - v \right\|_W$$

where $\|.\|_W$ represents a weighted $l_2$ norm, often referred to as an elliptic norm, where W is a diagonal matrix of positive weights. The above linear system can be discretized (with $\Delta t = 1$) as $$\xi_t - \xi_{t-1} = A_1 \xi_{t-1} + B_1 u_{t-1} \tag{1}$$

$$y_t - y_{t-1} = C(\xi_t - \xi_{t-1}) + D(u_t - u_{t-1}) \tag{2}$$

Under the assumption that controller dynamics is "fast", i.e. $B_2 = -I$ and $M = I$, so that $u_c = u_t$. This is done mainly for illustrative purposes to simplify the algebra, and is not fundamentally any more difficult to handle. Substituting 1 in 2 yields $$y_t - y_{t-1} = C(A_1 \xi_{t-1} + B_1 u_{t-1}) + D(u_t - u_{t-1}) \tag{3}$$

At time point t, the aim is then to minimize $$\min \|(y_t - y_{t-1}) - v\|_W$$

or, substituting 3, $$\min_{u_t} \|D u_t + CA_1 \xi_{t-1} + (CB_1 - D) u_{t-1} - v\|_W \tag{4}$$

Note that in the above objective function at time t, the quantities from time t−1 are already known, and $u_t$ is the variable the objective is optimized over. This is in contrast with Model Predictive Control where a time window of length greater than one unit of time is used.

The objective function 4 is a convex quadratic in $u_t$. In addition, there are bound constraints on and possibly other linear constraints involving $y_t$, $\Delta y_t$, $\Delta u_t$, that prevent the solution of the QP from resulting in actuator commands that may cause the system to fail. These can be rewritten as linear inequality constraints in $u_t$, and added to the mathematical programming formulation.

It so happens that the system under consideration is often operated under very extreme conditions. Consequently, it is important to take these inequality constraints into account. This is because a simpler solution to the QP without the inequality constraints would, in fact, violate those constraints under extreme conditions and lead the system to critical failure.

The system design has more actuators, hence control variables, than responses, hence the matrix D is underdetermined. The available degrees of freedom are used to attain a secondary objective in meeting desired values, $u_d$, for $u_t$. This secondary object can be expressed as $$\min_{u_t} \|u_t - u_d\|_S \tag{5}$$

The objective in 4 is penalized with the secondary objective above to obtain the combined objective. Squaring and adding the two parts for differentiability, the combined objective function is $$\min_{u_t} \|Du_t + CA_1\xi_{t-1} + (CB_1 - D)u_{t-1} - v\|_W^2 + \rho\|u_t - u_d\|_S^2 \tag{6}$$

where $\rho$ is a small scalar denoting the relative importance of the second objective, typically $10^{-3}$.

The addition of the secondary objective as a penalty term has a regularizing effect on the first term. It increases the magnitudes of the diagonal elements in the second order term in $u_t$ and makes the eigenvalues strictly positive. The QP thus becomes a strictly convex QP.

Role of secondary objective Having redundant controllers provides additional freedom that can be exploited in order to achieve secondary goals, such as the following:

Increasing the robustness of the system in the event of an actuator failure.

Operating the engine at a lower temperature, and hence increasing the life of the engine.

Maintaining control variable levels close to pre-determined best settings.

Increasing fuel efficiency of the engine.

Increasing margins for fast maneuvers. E.g. an actuator that responds faster can be set further away from its bound than a slower actuator. The centered faster actuator can then be used for quick response for a demanding swift maneuver.

Rename the optimization variables as x instead of $u_t$ to avoid cumbersome notation, the reduced problem can be put in the form of the following strictly convex QP with only inequality constraints:

$$\min_x q(x) = \frac{1}{2}x^T H x + c^T x$$

s.t. $Ax \leq b$ (7)

The challenge lies in arriving at a good solution within the allowed real time interval in a robust manner.

Further, H, c, A and b all vary from one time step to the next, but the subscript t is dropped for simplicity of notation (considering only QP at a particular time point here).

Solving a Convex QP

The two broad categories of techniques for solving a convex QP differ in how the inequality constraints are handled in the algorithm.

Active Set Method The older of the two is the active set method, where some of the inequalities are treated as equality constraints at every iteration and the next step is taken such that these equalities are not violated. The set of inequalities which are held as equalities, or are binding or active is referred to as the active set. Feasibility with respect to all the inequality constraints is maintained at every iteration. The Simplex Method for linear programming is a well-known example of an active set method. Theoretically, an active set algorithm could end up visiting all the vertices of the polytope, i.e., end up searching through all possible combinations of the constraints (as demonstrated by the pathological Klee Minty examples for linear programming). However, in practice, convergence is quite rapid.

Interior-Point Approach The other alternative is an Interior Point method, which can be thought of as applying Newton's method to the perturbed first-order necessary conditions for optimality of the QP. Iterates stay strictly feasible at every iteration (i.e., none of the inequalities are allowed to become binding). For a convex QP, the iterates could stay very close to what is known as the central path in course of convergence. Polynomial time convergence can be proved for Interior Point methods, i.e., they do not demonstrate the worst case exponential time behavior as a standard Simplex method does on the Klee Minty examples. Interior point methods are very well-suited for handling large problems with a large number of inequality constraints.

Why an active set method is more fitting In this case, some insight is offered by the physical system. The system is very often operated under extreme conditions, and it is not expected that the system to jump from one set of extreme conditions to another set of extreme conditions rapidly. Since the extreme condition in turn govern which inequality constraints are binding at the solution, the set of inequalities that are bonding at the solution to the QP at a particular time step provides a very good, often perfect, estimate of the active set at optimality for the QP in the next time step. This is a good reason to choose the active set method over the interior point method for the problem, since the solution can be used in the current time step to initialize the QP in the next time step.

An Active Set Method for the Problem

At the initial time point $t_o$, the QP is solved to optimality using an active set method. At any time point $t > t_o$, there is a limited budget of flops, which translates into a maximum number of iterations that can at most be executed. The procedure for thus solving the QP is sketched below.

Find initial feasible starting point. The fact that the active set method produces iterates that are feasible with respect to the constraints relies on having a feasible starting point to begin. For a general QP, one would need to solve a "phase 1" linear program to find a feasible point. Fortunately, the physical system under consideration permits the assumption that x=0 within the feasible set. x=0 corresponds to not issuing any new control commands in the current time point, and thus maintaining the state of the previous time point, which, though perhaps not optimal, should at least satisfy the constraints.

Subsequent iterations. Form the Working set. While the Active set is the set of inequality constraints that satisfy their right hand sides as equalities at the current iteration, the working set is a subset of the active constraints. This subset does not have to be a strict subset. For the algorithm, up to the first n active constraints are included in the working set, where n is the number of variables. In practice, the number of active constraints is much less that n, and hence all the active constraints are in the working set.

Given $x_k$, the current $k^{th}$ iterate, determine the next step $s_k$ by solving the equality constrained QP $$\min_{s_k} q(x_k + s_k) = \frac{1}{2}(x_k + s_k)^T H(x_k + s_k) + c^T(x_k + s_k)$$

s.t. $E_k(x_k + s_k) = r_k$ where $E_k$ is a matrix whose rows correspond to the rows of A containing the constraints in the working set, while the components of $r_k$ contain the corresponding subset of right hand side entries from b. In plain words, this above problem looks for the next point $x_k+s_k$ to be optimal with respect to the quadratic objective, while forcing the constraints in the working set to be held as equalities. However $\chi_k+s_k$ may well lie outside the feasible region.

Since $x_k$ is feasible and $E_k$ contains rows that were active in the previous iteration, $E_k x_k = r_k$. Substituting this in the above and re-casting the objective leads to the following equality constrained QP for determining the next step.

$$\min_{s_k} \frac{1}{2} s_k^T H s_k + (c + H x_k)^T s_k$$

s.t. $E_k s_k = 0$ \hfill (8)

The positive definiteness of H allows us to express the unique global minimizer of (8) in closed form, but special attention needs to be paid in the case when $E_k$ is rank-deficient. This will be elaborated in the next section. Assuming H is invertible (which is guaranteed by the addition of secondary objectives with strictly positive weights), the closed form solution to (8) turns out to be $$\lambda_k^* = -(E_k H^{-1} E_k^T)^{-1} E_k H^{-1} (c + H x_k) \quad (9)$$

and $$s_k^* = -H^{-1}(c + H x_k + E_k^T \lambda_k) \quad (10)$$

where $\lambda_k$ denotes the Lagrange multipliers of the constraints $E_k s_k = 0$.

The implementation of the solution in this form thus allows us to pre-compute the Cholesky factorization of H (a proxy for its inverse) at the onset of the iterations, and then re-use this already computed factorization in every iteration, thus reducing the overall computational cost per iteration in comparison with solving the original linear system at every iteration. Thus, this procedure exploits the fact that H is invertible in avoiding the solution of a much larger linear system at each iteration.

Drop constraints corresponding to negative components of the multipliers $\lambda_k$ from the working set. A negative value of the multiplier indicates that it is possible to move in the strict interior of the inequality constraint and improve the value of the objective. Hence those inequality constraints cannot be binding at the optimum.

Given the step $s_k$, determine the maximum value of $\alpha \in [0,1]$ such that $\chi_k + \alpha s_k$ is feasible. In other words, the step is scaled back so that the updated point is feasible. This leads to a new set of active constraints.

Update the current iterate $$x_{k+1} = x_k + \alpha s_k$$

If no constraints were dropped from the working set, i.e. all multipliers were non-negative, and if no new constraint became active, i.e., the step lies within the feasible region and $\alpha=1$, then the current point $x_{k+1}$ is optimal.

Otherwise, return to the initial step to choose the working set.

While it can be proved that the above iterations would converge to the global optimum in a finite amount of time, a solution must be provided within the allowed time frame. Thus the execution of only a pre-set maximum number of the iterations described above is allowed, depending on how many flops the processor can handle within the allowed real-time interval. Part of the flop budget is also set aside to compute the global optimum of the unconstrained objective scaled back to lie within the feasible region. This point, x*, is computed as follows:

$$x^* = -\alpha H^{-1} c \quad (11)$$

where $\alpha$ is the largest number in [0, 1] such that x* lies within the feasible region. Such a value of $\alpha$ always exists given the earlier assumption that x=0 is always feasible.

Now given the above solution, which referred to as the scaled, unconstrained solution, and the best point obtained by the QP iterations, the best solution thus far is returned. The QP algorithm produces feasible iterates that improve the objective at every iteration. A formal proof of this based on convexity is provided in the following sub-section.

It is possible that the QP may not be solved to optimality in some of the time intervals. However, it is hoped that the final iterations in the current time interval will provide a good lead or a hot start for the QP in the next time interval, and thus convergence will eventually be attained in a subsequent time interval. It does not seem necessary because convergence is attained for every QP in the allowed time interval.

QP iterates improve the objective function monotonically at every iteration, which can be proved rigorously.

Handling Degeneracy in the Constraints and Computing the Step and the Multipliers Degeneracy is caused by introducing redundant constraints that could alternatively have been expressed as linear combinations of other constraints. Often, such dependent constraints could become active at the same time, and end up in the working set. This results in the loss of row rank in $E_k$, and needs to be dealt with in the computation. In the simplex method for linear programming, where only one active constraint is added to the working set and only one is dropped in a given iteration, degeneracy could lead to 'cycling' amongst some choices of the active sets, and can be rectified with simple rules like Bland's Rule. However, the active set is constructed differently for this QP algorithm, and cycling is not an issue dealt with here. Nevertheless, handling the computation of the multipliers in (9) when $E_k$ loses rank is not necessary, and this is chalked out below.

The essential idea is to use a QR factorization of $E_k H^{-1} E_k^T$. This may appear unconventional, since in nonlinear programming, it is more common to perform a QR factorization of $E^T$ and then use the factorization to come up with a basis for the null space of E and use it in computing $\lambda$ and $s_k$. However, this approach requires fewer flops for this particular algorithm.

Compute $w_k = c + H x_k$

Use a sequence of back solve and forward solve using the Cholesky factorization (L) of H computed earlier to solve for the columns of the matrix $B_k$ $H B_k = E_k$ Compute $r_k = B_k w_k$ Compute $M_k = B_k E_k^T$ Perform a QR factorization of the m×m matrix $M_k$, where m is the number of constraints in the working set. So $$QR = E_k H^{-1} E_k^T$$

Form $Q^T r_k$. Since Q is orthogonal, the multipliers can be obtained by solving $$R \lambda_k = -Q^T r_k$$

This is only a forward solve involving $O(m^2)$ operations since R is upper triangular. This is where the effects of degeneracy come into play. A degenerate working set can cause the diagonal entries in R corresponding to the dependent constraints to become zero. So whenever a zero pivot is encountered during the forward solve, the corresponding component of $\lambda_k$ is set to zero as well. Mathematically, the values of the multipliers can be set to any number. However, they are set to zero to indicate that these multipliers correspond to redundant constraints that do not play a role in the current subproblem.

Once $\lambda_k$ has been determined, the step in x is obtained as $$s_k = -H^{-1}(w_k + E_k^T \lambda_k)$$

Exploiting Performance Programming for Computational Efficiency

Maximal advantage of computational efficiencies is taken in performing the linear algebra computation in the above formulas in an object-oriented C++ implementation. Along with avoiding common pitfalls like creating copies of objects, frequently called functions such as access operators are automatically inlined, and other features of C++ are used to result in the efficiencies listed below. It is believed that there is no code for Quadratic Programming, available commercially or otherwise, that employs the suite of efficiency-maximizing schemes below:

While accessing elements of a matrix, it is more efficient to access adjacentd blocks of memory at once. The linear algebra involved in the QP algorithm was carefully analyzed, and it was determined that it was best to access the elements of some matrices row-wise, while for others, the elements had to be accessed column-wise. The pre-defined two dimensional arrays in no programming language would allow for two types of access (e.g., in C, the 2-D arrays are stored row-wise, and in Fortran, columnwise). It is only by means of defining objects in C++ that the Accelerated QP algorithm can make use of matrices that store the elements differently. Based on how the elements are stored, custom routines were also implemented for matrix-vector multiplications that take full advantage of the storage schemes. Other matrix classes such as Upper and Lower Triangular and Symmetric Matrix were also implemented which enable the Accelerated QP algorithm to take full advantage of the storage schemes.

The QP algorithm uses a matrix whose rows are a sub-set of the rows of the constraint matrix for the original problem. The Accelerated QP implementation in C++ allows for a 'parasite matrix' that contains no memory of its own but simply points to the rows of the parent matrix. All linear algebra operations possible on the host matrix are possible on the parasite matrix. This helps to avoid a lot of copying.

It is necessary to solve a linear system at every QP iteration in order to determine the multipliers for the working constraints, which forms the bulk of the computational cost. For the sake of stability, this is done by means of a QR factorization. The key efficiency enhancement here was in recognizing that the Q matrix need not be formed in order to solve the system. All that is required is multiplication of the transpose of Q by a vector. This can be done by using the Householder transformation vectors for the QR factorization without forming Q at all, thus saving a good amount of flops. Another important thing to realize here is that very often the dimension of the system solved was only 1×1 or 2×2, because the dimension of the system is equal to the number of constraints in the working set. Since the linear system can be solved trivially for the 1×1 case and more directly using a closed form formula based on determinants for the 2×2 case, these two cases are handled separately and thus require many fewer flops than with the QR factorization.

It is important to emphasize that in developing the above algorithm, primary attention was given to making it stable, dependable and robust. So the Accelerated QP algorithm is not only swift, but also very robust. Contrary to convention, the QR factorization approach is used to compute the Lagrange multipliers in order to handle cases that may be degenerate, i.e., where constraints that become binding simultaneously are linearly dependent. This situation may be caused by redundant constraints that reflect the same physical limitation. The system to which this invention is applied may have such redundant constraints built in for the sake of robustness.

Further, in the algorithm, some matrix vector multiplications for rows corresponding to constraints in the working set are avoided, because the results are known by virtue of the fact that they are in the working set. This avoids small (but critical) floating point errors that creep up otherwise, while lowering flops as an added bonus.

What is claimed is:

1. A method for controlling a multivariable system including the steps of:
    a) receiving a plurality of sensor signals indicating current conditions of the system, which are sampled;
    b) receiving a plurality of commands;
    c) determining a desired dynamic response of the system based upon the commands and the sensor signals;
    d) in each of a plurality of time steps, formulating a problem of controlling the system to achieve the desired dynamic response as a solution to a quadratic programming problem while observing a plurality of constraints;
    e) solving the quadratic programming problem in each time step using an iterative algorithm which searches for an optimal active set of the plurality of constraints that are binding at an optimized solution to the quadratic programming problem by dropping at least one of the plurality of constraints that is not binding at the optimized solution;
    f) in each subsequent time step of the plurality of time steps, initializing a search for the optimal active set with the optimal active set of a prior time step of the plurality of time steps; and
    g) effecting the desired dynamic response on the system based upon said step e).

2. The method of claim 1 wherein said step e) further includes the procedure of dropping the at least one constraint with a negative Lagrange multiplier.

3. The method of claim 2 wherein said step e) further includes the procedure of dropping all constraints with negative Lagrange multipliers.

4. The method of claim 1 further including the step of using a QR factorization to improve robustness in the event of degeneracy.

5. The method of claim 1 where a total number of iterations of the iterative algorithm is fixed in order to be time predictable.

6. The method of claim 1 further including the step of formulating the quadratic program at every iteration in a manner so that the next iterate is an improvement on a previous iterate.

7. The method of claim 1 further including the step of:
    precomputing a Cholesky factorization of H; and
    using the precomputed Cholesky factorization of H in a plurality of iterations of the iterative algorithm of step e).

8. The method of claim 1 furthering including determining the Cholesky factorization via a QR factorization of a generalized square root matrix of H.

9. The method of claim 1 wherein the solution includes a plurality of control variables and wherein said step d) further includes the step of formulating the problem to include a plurality of constraints on the plurality of control variables, wherein the optimal active set is a subset of the plurality of constraints that are binding on the control variables at the optimized solution.

10. The method of claim 9 wherein the optimal active set is the subset of the plurality of constraints that are binding on the control variables at the optimized solution in the current time step.

11. The method of claim 10 wherein said step e) further includes the procedure of dropping at least one constraint with a negative Lagrange multiplier.

12. The method of claim 11 wherein said step e) further includes the procedure of dropping all constraints with negative Lagrange multipliers.

13. The method of claim 12 further including the step of formulating the quadratic program at every iteration in a manner so that the next iterate is an improvement on a previous iterate.

14. The method of claim 13 further including the step of:
precomputing a Cholesky factorization of H; and
using the precomputed Cholesky factorization of H in a plurality of iterations of the iterative algorithm of step e).

15. A multivariable control system comprising:
a plurality of sensors indicating current conditions of the system;
a plurality of effectors for changing dynamics of the system in response to effector commands;
a dynamic feed forward module determining a desired dynamic response;
a dynamic model follower comparing desired and actual system responses to adjust an output change command as needed;
a dynamic inversion module determining the effector commands in order to change the system output based upon the determination by the dynamic feed forward and dynamic model follower modules by formulating a problem of controlling the system to achieve the desired dynamic response as a solution to a quadratic programming problem in each of a plurality of time steps, the system having a plurality of constraints; and
a quadratic programming module finding an optimized solution to the quadratic programming problem in each time step using an iterative algorithm which searches for an optimal active set of the plurality of constraints by dropping at least one constraint from the plurality of constraints, wherein the active set is a set of constraints on the effector commands that are binding at an optimized solution, the quadratic programming module initializing a search for the optimal active set in each subsequent time step with the optimal active set of a prior time step.

16. The system of claim 15 wherein the quadratic programming module guesses the active set based upon Lagrange multipliers of a subset of the constraints.

17. The system of claim 16 wherein the quadratic programming module drops all constraints with negative Lagrange multipliers.

18. A computer readable medium storing a computer program, which when executed by a computer performs the steps of:
a) receiving a plurality of sensor signals indicating current conditions of a system, which are sampled;
b) receiving a plurality of commands;
c) determining a desired dynamic response of the system based upon the commands and the sensor signals;
d) in each of a plurality of time steps, formulating a problem of controlling the system to achieve the desired dynamic response as a solution to a quadratic programming problem;
e) solving the quadratic programming problem in each time step using an iterative algorithm which searches for an optimal active set of a plurality of constraints on the system not including at least one of the plurality of constraints that is not binding at the optimized solution, the active set comprising a set of the plurality of constraints that are binding at the optimized solution to the quadratic programming problem;
f) in each subsequent time step of the plurality of time steps, initializing a search for the optimal active set with the optimal active set of a prior time step of the plurality of time steps; and
g) effecting the desired dynamic response on the system based upon said step e).

19. The computer readable medium of claim 18 wherein said step f) further includes the step of guessing the active set based upon Lagrange multipliers of a subset of the constraints.

20. The computer readable medium of claim 19 wherein said step f) further includes the step of dropping all constraints with negative Lagrange multipliers.

* * * * *